United States Patent [19]

Felix

[11] Patent Number: 4,562,693
[45] Date of Patent: Jan. 7, 1986

[54] REAPING, BINDING AND SHOCKING MACHINE FOR SESAME PLANTS

[76] Inventor: Gloria E. Felix, 16783 Beach Blvd., Huntington Beach, Calif. 92647

[21] Appl. No.: 525,554

[22] Filed: Aug. 22, 1983

[51] Int. Cl.⁴ ............................................ A01D 45/00
[52] U.S. Cl. ...................................... 56/131; 56/140; 56/70
[58] Field of Search .................. 56/68, 69, 70, 71, 75, 56/76, 78, 131, 140, 14.5, 67

[56] References Cited

U.S. PATENT DOCUMENTS

| | | | |
|---|---|---|---|
| 582,654 | 5/1897 | Lindsey . | |
| 1,440,517 | 1/1923 | Wilson . | |
| 1,509,432 | 9/1924 | Johnson . | |
| 1,769,144 | 7/1930 | Kowalsky | 56/67 |
| 2,337,355 | 12/1943 | Spell | 55/62 |
| 2,514,338 | 7/1950 | Roberts | 55/9 |
| 2,862,347 | 12/1958 | Nelson | 56/131 |
| 3,131,525 | 5/1964 | Mott et al. | 56/25.4 |
| 3,961,466 | 6/1976 | Martin et al. | 56/14.3 |
| 3,982,384 | 9/1976 | Rohweder et al. | 56/106 |
| 4,135,350 | 1/1979 | Miystake | 56/131 |
| 4,184,314 | 1/1980 | Hobbs | 56/372 |
| 4,211,059 | 7/1980 | Decoene | 56/94 |
| 4,236,369 | 12/1980 | Decoene | 56/60 |
| 4,365,461 | 12/1982 | Schütt | 56/130 |

FOREIGN PATENT DOCUMENTS

| | | | |
|---|---|---|---|
| 336632 | 4/1959 | Switzerland | 56/131 |
| 120702 | 12/1959 | U.S.S.R. | 56/131 |

Primary Examiner—Robert P. Swiatek
Assistant Examiner—David L. Tarnoff
Attorney, Agent, or Firm—Albin H. Gess

[57] ABSTRACT

A machine that attaches to a tractor is structured to reap, blind, and shock mature sesame plants. The machine is capable of engaging two rows of plants simultaneously, the two stalkways merging into one prior to the tying mechanism. Each row of plants is severed at the base by a pair of disc cutters. The cut stalks are moved rearwardly in an upright position by vertically disposed conveyor belts having fingers attached thereto to grasp the stalks. The stalks from both stalkways are gathered at a first tying station having two tying mechanisms which ties them into bundles. The bundles are moved rearwardly on a horizontal conveyor belt to a second tying station having one tyer where the bundles are gathered and tied together into stacks of optimum size. The stacks, comprising about five bundles each, slide down a ramp to engage the stubble of the cut sesame plants. The stacks stand upright on the ground thereafter to dry naturally.

7 Claims, 6 Drawing Figures

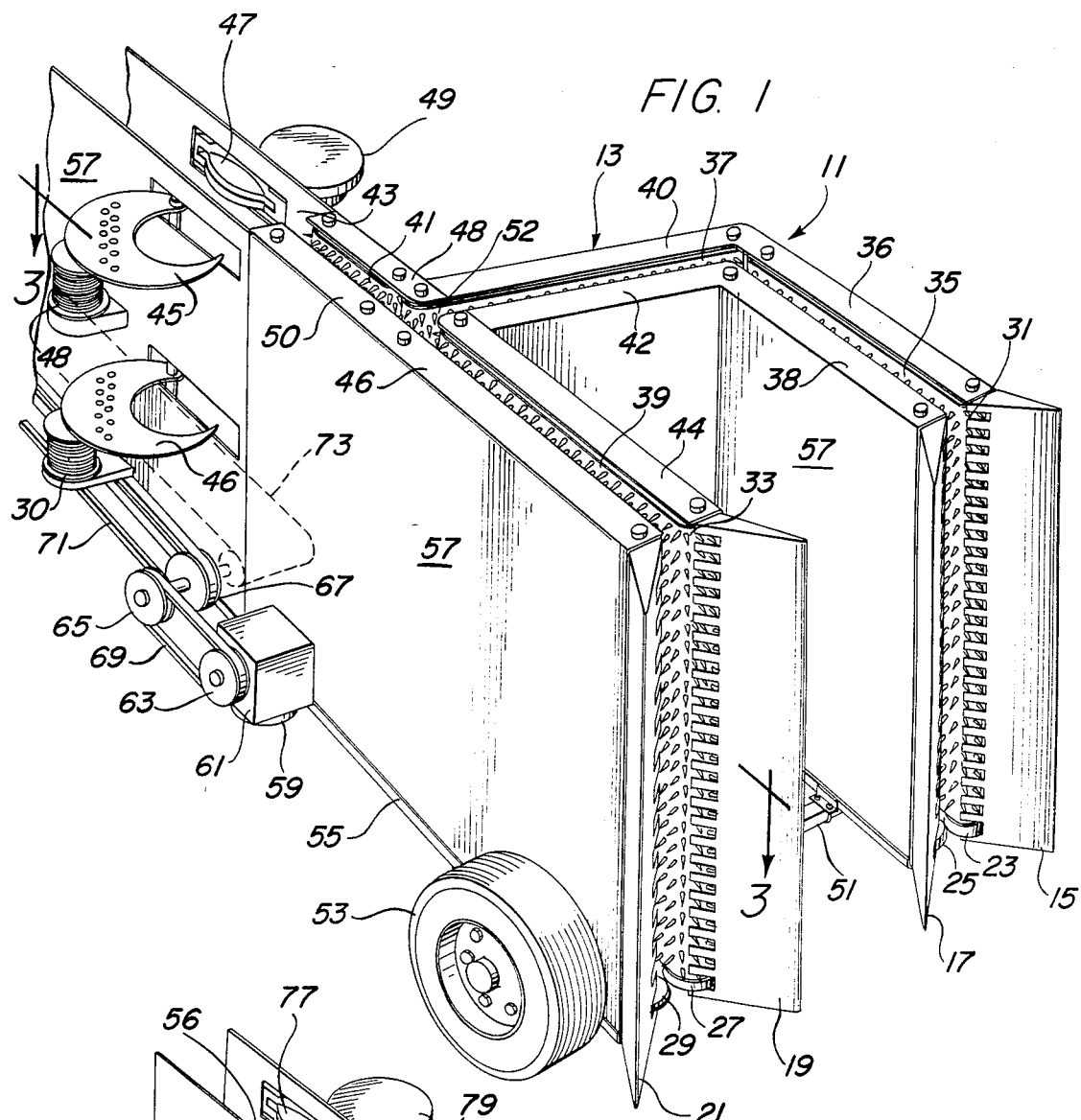
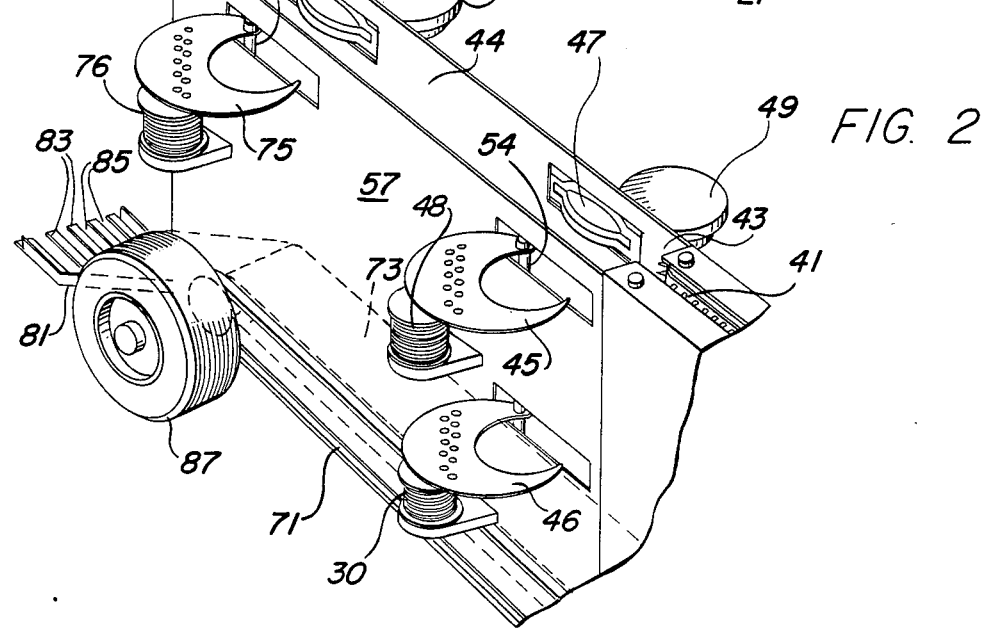
FIG. 1
FIG. 2

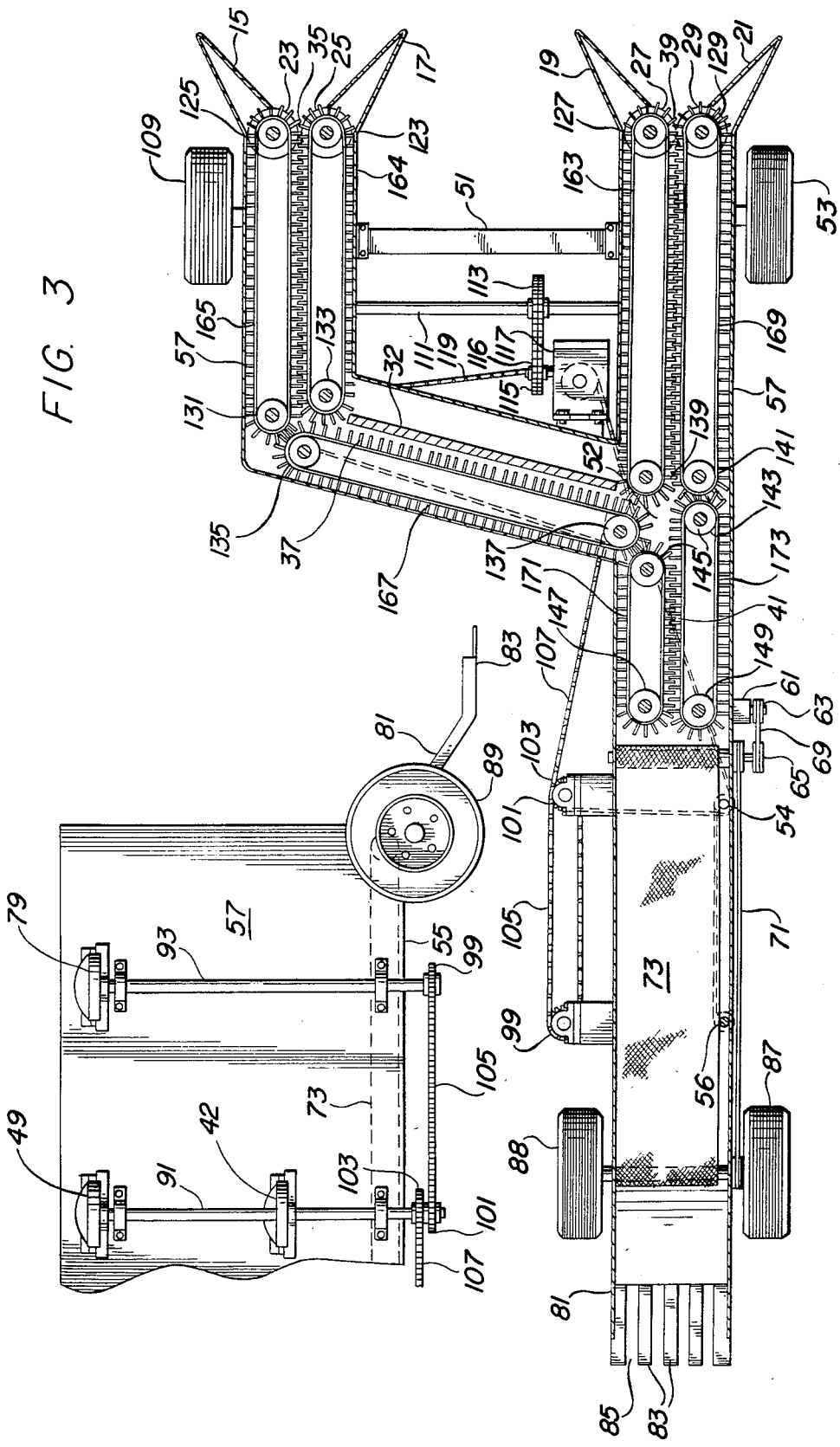

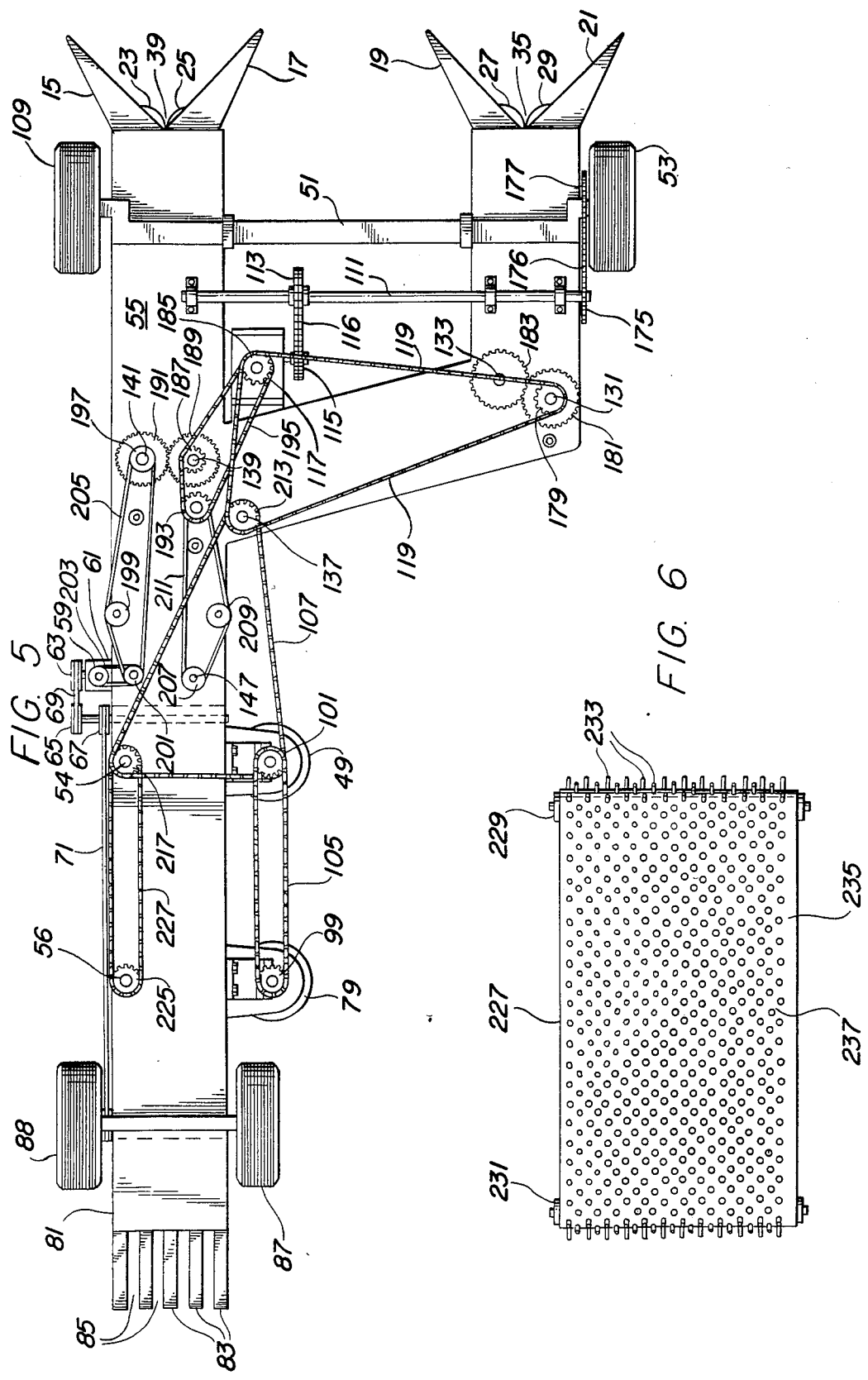

REAPING, BINDING AND SHOCKING MACHINE FOR SESAME PLANTS

BACKGROUND OF THE INVENTION

1. Field of the Invention

The present invention relates generally to improvements in row crop harvesting machinery and more particularly pertains to a new and improved machine for reaping, binding and shocking row crop stalk plants.

2. Description of the Prior Art

In the field of machine harvesters, a variety of equipment and implementation exists to perform the harvesting and shocking function on row crops such as corn or field crops such as wheat. Although such devices work quite satisfactorily for these well-known crops, no devices have been adapted to reap, bind and shock sesame plants.

To the present day, sesame plants, which is a row crop having stocks that could reach as high as six feet are being harvested, bound and shocked by hand. The reason is the peculiar requirements of the sesame plant, which includes the need to stand upright in the open air for a considerable period to time to dry. After the drying process, the seed pods open upon slight vibration to allow the sesame seeds to be collected from the plants.

To applicant's knowledge, none of the harvesters available for such crops as corn, wheat or alfalfa are adapted to minipulate the sesame seed plant in the manner required.

The present invention accomplishes this end in a machine that is efficient in comparison with the harvesters on the market today, thereby increasing the yield per acre considerably.

SUMMARY OF THE INVENTION

An automatic cutting, binding and shocking machine is provided wherein several rows of sesame plants may be harvested simultaneously. The plants are individually cut at their base by disc cutters. The cut stalks are moved by vertically-disposed, specially-constructed conveyor belts mounted in stalkways. The conveyor belts have a plurality of rubber fingers fastened thereto extending into the stalkway for grasping the plant stalks. The stalkways merge just prior to a first tying station where they are gathered into bundles and tied. A horizontally disposed conveyor belt moves the tied bundles of sesame plant stalks along a bundleway to a second tying station which gathers the bundles into stacks of about five bundles each and ties them. The stacks leave the second tyer mechanism, to slide down a slotted ramp, engage the stubble of the cut sesame plants and thereafter remain in an upright free-standing position to dry naturally.

BRIEF DESCRIPTION OF THE DRAWINGS

The objects and many of the attendant advantages of this invention will be readily appreciated as the same becomes better understood by reference to the following detailed description when considered in conjunction with the accompanying drawings in which like reference numerals designate like parts throughout the figure thereof and wherein:

FIG. 1 is a perspective of the front end of the machine according to the present invention.

FIG. 2 is a perspective of the rear end of the machine according to the present invention.

FIG. 3 is a cross-sectional view of the machine according to the present invention from the top looking in the direction of the arrows 3—3 on FIG. 1.

FIG. 4 is a side elevation of one side of the rear end of the machine according to the present invention.

FIG. 5 is a bottom view of the machine according to the present invention.

FIG. 6 is an illustration of one of the conveyor belt devices utilized in the machine according to the present invention.

DESCRIPTION OF THE PREFERRED EMBODIMENT

FIG. 1 illustrates the front end of the reaping, binding and shocking machine 11 according to the present invention. The machine 11 is moved through the field of row crop by a tractor or similar motive means by either pushing it at point 13 or pulling it through the field. The machine 11 is illustrated as having a pair of stalkways 35 and 39 spaced apart the appropriate distance that the rows of sesame plants are spaced apart. The invention, however, should not be limited to two stalkways. More or less stalkways could be utilized.

Each stalkway has a pair of gathering arms. Stalkway 35 has gathering arms 15 and 17. Stalkway 39 has gathering arms 19 and 21 to gather the plants into the cutting edges of cutting discs mounted at the bottom of mouth 31 and mouth 33 of the respective stalkways. Stalkway 35 has mounted at the front thereof a pair of cutting discs 23 and 25. Stalkway 39 has mounted at the front a pair of cutting discs 27 and 29. These discs serve to sever the stalk of each plant as it is gathered ino the opening of the individual stalkways 35 and 39.

After each stalk is cut, it moves into the mouth of the stalkway and is picked up by a vertically disposed endless conveyor belt and moved rearwardly. Stalkway 35 has a conveyor belt assembly mounted therein as will be explained below. Stalkway 39 has a conveyor belt assembly mounted therein also. The structure of these conveyor belts are unique to this particular machine and invention and will be explained more fully in conjunction with the illustration in FIG. 6.

Stalkway 39 is essentially a straight path from the mouth 33 to the first gathering location 43 for the stalks. Stalkway 35 has essentially in two parts, a straight-back path and an angled portion 37. This portion 37 of stalkway 35 emerges with stalkway 39 so that the stalks of the sesame plants severed by cutting discs 23 and 25 are comingled with the stalks severed by cutting discs 27 and 29 of stalkway 39. Comingled stalks are moved by conveyor belts in section 41 to the stalk gathering location 43.

As can be seen in FIG. 1, the conveyor belts and their drive mechanisms are essentially contained within a housing having walls 57 of a preferred height, approximately two-thirds the height of the sesame plants being harvested and the bottom 55. Both the side walls and floor are preferably made of a sturdy material such as metal. The walls of the stalkway structure are capped by ledges 36, 38, 44, 46, 48, 50 and 42, 40. These ledges perform multiple functions. They enclose the conveyor belt systems and drive mechanisms for these belts, thereby keeping out the dirt normally encountered in the environment they act as structural support members for the drive mechanisms. They provide a guideway for the stalks that move therethrough. For example the mouth or opening of stalkways 35 and 39 between the shelves 36, 38, 44 and 46, are about three inches wide.

Shelves 40 and 42 merge in with shelves 46, 48, 44 and 50.

The entire machine, as can be seen from FIGS. 1 and 2 and more clearly from FIGS. 3 and 5, is mounted on a pair of front wheels 53, 109 and a pair of rear wheels 87 and 88, thereby allowing the machine to be pushed or pulled over the terrain or planted field.

The means by which these vertically disposed conveyor belts are driven will be explained hereafter in connection with FIGS. 3 and 5. The means by which the other automatically operated devices are driven will also be explained in connection with FIGS. 3 and 5.

Referring now to both FIGS. 1 and 2, the first gathering location 43 for the individual stalks is at the end of stalkway 41 at the first tying station, having two like tying mechanisms. The first mechanism having parts 45, 47, 48 and 49. This tying mechanism gathers together a plurality of stalks into a bundle of a preferred size. Then it automatically ties them together into a bundle. The second tying mechanism 46, 30 is disposed underneath the first. The operation of each tying mechanism is standard and well-known as a corn-tier mechanism. The first mechanism includes a flywheel 49 for the bow-maker 47 and a thread spool 48 for threading a needle 45. The second mechanism at the first tying station likewise is shown as having a needle 46 and a thread spool 30. By using two tying mechanisms arranged as shown in FIGS. 1 and 2 at the first tying location, each bundle is tied at two locations along its length. This provides a very secure bundle.

Upon the gathering and tying of the individual stalks into bundles, the bundles are moved to the next gathering position 44 by a horizontally disposed conveyor belt 73 (shown in dash lines in FIGS. 1 and 2 and solid lines in FIG. 3). The bundles are gathered at the second gathering location 44 and there tied together into stacks, preferably of five bundles, by a similar tying mechanism having parts 75, 76, 77 and 79.

After being tied into bundles, the sesame seed plant stacks move to a ramp 81 to slide down to a slotted portion of the ramp 83 and engage the stubble of the cut sesame plants through slots 85. The stubble interleaves with the base of each cut sesame stacks and effectively holds it upright so that the individual plants can dry naturally, in an upright position.

The driving mechanism for the horizontally disposed conveyor belt 73 (FIG. 3) is a V-belt or similar drive. The belt 71 drives a pair of pulleys at either end of the endless horizontally disposed conveyor belt 73. These pulleys in turn are driven by pulley 65 which is connected to a gearbox 61 by another pulley 63 and a V-belt 69. An explanation of the driving means for gearbox 61 will be provided in connection with the explanation of the illustration of FIG. 5.

Referring now to FIG. 4, the driving means for the tying mechanisms is more clearly illustrated. The flywheels 42, 49 and 79 of the three tying devices are respectively connected to shafts 91 and 93 that run along the outside of the metal body 57 of the bundleway. A sprocket 99 is mounted at the bottom end of shaft 93. Two sprockets 103 and 101 are mounted at the bottom end of shaft 91. A chain 105 connects sprockets 99 and 101. A chain 107 connects sprocket 103 to sprocket 213 (FIG. 5). The chain drive system for the two tying mechanisms insures that the mechanisms work in synchronism.

Referring now to FIG. 3, the location of the belt-drive system for the machine is clearly shown. For the stalkway 39, a mandrill 129 at the front and another mandrill 141 at the emerging point 52 have a continuous belt 169 disposed about them. The mandrills, as illustrated, are mounted with their axes parallel to the vertical, i.e. perpendicular to the ground. A mandrill 127 and mandrill 139 have disposed about them another continuous belt 163 which coacts with belt 169 to move the severed stalks of the sesame plants rearwardly to merge point 52.

The other stalkway 35–37 is made up of three continuous belt arrangements because of the angle in the stalkway. The first leg of stalkway 35 is made up of mandrills 125 and 131 having continuous belt 165 disposed thereabout. At the band, mandrill 135 is paired with mandrill 137 and a continuous belt 167 is disposed thereabout. On the other side of the stalkway 35, mandrill 123 is paired with mandrill 133 with continuous belt 164 disposed thereabout.

The portion of the stalkway 37 which merges into stalkway 39 utilizes a single continuous belt 167 disposed about mandrill pairs 135 and 137 and a vertically standing plate 32 which is just underneath the edge of shelf 42 (FIG. 1) so that the fingers of belt 167 are very close to vertical wall 32.

At the merge point 52, the individual stalks are picked up and moved along stalkway 41 by continuous belt pairs 171 and 173, which are respectively driven by mandrill pairs 145, 147 and 143, 149. Stalkway 41 ends at horizontally disposed conveyor 73, which as explained earlier, is driven through gearbox 61 by V-belt 71.

Certain of the mandrills that drive the endless belts receive their power from gear-reducer box 117 which is connected by a sprocket 115 and chain 116 to a sprocket 113 of a drive shaft 111. As is more clearly illustrated in FIG. 5, drive shaft 111 is geared to wheel 53 by means of a sprocket 175, a drive chain 176 and a sprocket 177 connected to wheel 53 to turn therewith.

Turning now to FIG. 5, the drive connections for the mandrills of the various conveyor belts are illustrated. The sprocket 177 connected to the wheel and the sprocket 175 connected to the drive shaft 111 preferably have a 1:1 ratio. The sprocket 113 is fixedly attached to draft shaft 111. The relation of sprocket 113 to sprocket 115 is preferably a 1:2 ratio. The gear reducer 117 receives the input power at sprocket 115 from chain 116 and produces output rotation at sprocket 185. The ratio of the two is preferably 30:1.

Sprocket 185 is a double-wheel sprocket having drive chain 119 thereon and drive chain 195 thereon. Drive chain 119 drives sprocket 213 and sprocket 179. Sprocket 179 is connected to gear 181 which meshes with and drives gear 183. Gear 183 is connected to mandrill 133. Sprocket 179 and gear 181 are connected to mandrill 131. These two mandrills 131 and 133 of stalkway 35 are the driving mandrills for continuous conveyor belts 165 and 164 (FIG. 3). Mandrill 135 in stalkway 37 is an idler (FIG. 3). Mandrill 137 of stalkway 37 is driven as a result of being fastened to sprocket 213 which is driven by chain 119 out of the gear reducer 117 (FIG. 3).

In stalkway 39, sprocket 185 drives sprocket 187 and 193 by way of chain drive 195. Sprocket 187 is connected to gear 189 which in turn meshes with and drives gear 191. Gear 191 is in turn connected to mandrill 141. Sprocket 187 and gear 189 are connected to mandrill 139. These two mandrills in turn drive belts 163 and 169, respectively, of stalkway 39 (FIG. 3). Sprocket 193 also has a V-belt pulley attached thereto. A V-belt 211 drives pulley 207 over an idler pulley 209. Pulley 207 connects to mandrill 147.

Gear 191 has mounted to the shaft thereof a V-belt pulley 197 which by way of V-belt 205 drives a pulley 201 over an idler pulley 199. Pulley 201 attaches to mandrill 149 (FIG. 3). Mandrill 149 and 147, respectively, are the drive mandrills for the belts 171 and 173 in stalkway 41. Mandrills 145 and 143, respectively, are idler mandrills.

Pulley 201 (FIG. 5) is mounted on a shaft with another pulley thereon that by V-belt 203 connects pulley to 59 the power input for gearbox 61. Gearbox 61, in turn, provides power to the mandrills driving horizontally disposed conveyor belt 73 as explained earlier.

Sprocket 213 is a double sprocket which also has a chain 107 attached thereto that drives sprockets 101 and 217. Sprocket 101 is a double sprocket that, by way of chain 105, drives sprocket 99 which are the two mandrills for the spools in the tying machine. Sprocket 217 is a double sprocket that, by way of chain 227, drives sprocket 225. Both of these sprockets cause the needle mechanisms 45 and 75, respectively, to operate.

Referring now to FIG. 6, the construction of the various vertically disposed conveyor belts used in the machine is illustrated. As can be seen, the belt has the width of the height of the walls 57 of the machine itself. The belt is disposed between a pair of mandrills 229 and 231, at least one of which is driven. The belt itself can be made out of a variety of materials such as felt or a composition of rubber and felt or like material. Mounted on the belt as a plurality of rubber bumpers 233 which are glued thereon preferably by Wellwood Contact Smith Glue or a similar substance. A specific staggered pattern is used. As illustrated, rows such as 235 and 237 are staggered so that the pattern of one belt of a pair complements with the pattern of another belt of that pair so that the fingers intermesh in an appropriate manner during rotation in the machine.

What has been described is a preferred embodiment of a reaping, binding and shocking machine for sesame plant row crops which replaces the hand-labor previously required to harvest sesame plants. Many modifications and variations of various parts of the present embodiment are possible in light of the above teachings. It is, therefore, to be understood that within the scope of the appended claims, the invention may be practiced otherwise than as specifically described.

What is claimed is:

1. A sesame plant row crop reaping, binding and shocking machine, comprising:
   a pair of discs mounted to rotate about respective axes that are at an angle to the ground, said discs coacting to sever the stalk of a sesame plant at its base, leaving a stubble behind;
   a first stalkway with an opening at its forward end, said stalkway being about two-thirds the height of the sesame plants being harvested;
   a pair of endless conveyor belts substantially the width of the stalkway vertically disposed within said stalkway, each conveyor belt including a plurality of rubber fingers mounted thereon so as to reach into the stalkway in an interlocking manner, said pair of conveyor belts interacting to move the cut stalks of the sesame plant rearwardly in an upward position;
   a first tying means for gathering and tying a plurality of individual sesame plants into a bundle;
   a second tying means for gathering and tying the bundles of sesame plants into stacks; and
   ramp means for moving the upright stacks of sesame plants into engagement with the stubble of the cut sesame plants, thereby holding the stacks in an upright position for natural drying wherein said ramp means has a plurality of parallel slots therein extending from the bottom of the ramp, thereby allowing the stubble of the cut sesame plants to extend upright therethrough and engage the stalks of sesame plants as they slide down the ramp.

2. The sesame plant row crop machine of claim 1 further comprising:
   a second stalkway with an opening at its forward end, said second stalkway being at about two-thirds the height of the sesame plants being harvested and having a straight portion and an angled portion towards said first stalkway, and joining with it;
   a first pair of endless conveyor belts vertically disposed within said second stalkway in the straight portion and coacting to move the cut stalks of the sesame plants rearwardly in an upright position; and
   a second endless conveyor belt vertically disposed within said stalkway in the angled portion, to move the cut stalks of the sesame plants toward and into said first stalkway.

3. The sesame plant row crop machine of claim 1 further comprising drive means powered by rotation of the wheels of said machine for driving said pair of endless conveyor belts at a speed that causes the required number of sesame plant stalks to be gathered at said first tyer before each tying operation.

4. The sesame plant row crop machine of claim 1 wherein said second conveyor means for moving the tied bundles comprises a horizontally disposed endless conveyor belt on which the bundles of sesame stalks are carried in an upright position to the second tying means.

5. The sesame plant row crop machine of claim 4 further comprising drive means powered by rotation of the wheels of said machine for driving said first conveyor means at a fixed speed and for driving said horizontally disposed endless conveyor belt at a speed related to the speed of said first conveyor means.

6. The sesame plant row crop machine of claim 4 wherein said ramp means comprises a ramp angled downward from the plane of said second conveyor means to the ground.

7. The sesame plant machine of claim 1 wherein the first trying means ties the bundle in two places along the stem of the sesame plants.

* * * * *